US008216736B2

(12) United States Patent
Kwon

(10) Patent No.: US 8,216,736 B2
(45) Date of Patent: Jul. 10, 2012

(54) FUEL CELL SYSTEM USING EVAPORATIVE COOLING METHOD

(75) Inventor: Hyuck Roul Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 12/286,881

(22) Filed: Oct. 1, 2008

(65) Prior Publication Data

US 2009/0214915 A1 Aug. 27, 2009

(30) Foreign Application Priority Data

Feb. 25, 2008 (KR) ........................ 10-2008-0016618

(51) Int. Cl.
*H01M 8/02* (2006.01)
*H01M 8/04* (2006.01)

(52) U.S. Cl. ......... 429/437; 429/439; 429/455; 429/413

(58) Field of Classification Search ........................ None
See application file for complete search history.

(56) References Cited

U.S. PATENT DOCUMENTS

| 6,045,934 | A * | 4/2000 | Enami | 429/30 |
| 6,207,308 | B1 | 3/2001 | Grasso et al. | |
| 6,331,366 | B1 * | 12/2001 | Van Dine et al. | 429/425 |
| 6,428,916 | B1 * | 8/2002 | Grasso et al. | 429/13 |
| 2003/0039875 | A1 * | 2/2003 | Horiguchi et al. | 429/26 |
| 2003/0186097 | A1 * | 10/2003 | Demissie et al. | 429/26 |

FOREIGN PATENT DOCUMENTS

| JP | 2000-243420 | 9/2000 |
| JP | 2006-156252 | 6/2006 |

* cited by examiner

*Primary Examiner* — Keith Walker
(74) *Attorney, Agent, or Firm* — Edwards Wildman Palmer LLP; Peter F. Corless

(57) ABSTRACT

The present invention provides a fuel cell system using evaporative cooling that generates electricity by reacting hydrogen as a fuel and air as an oxidant. The system includes a fuel cell stack including a cooling channel provided on a bipolar plate separately from an air channel and a hydrogen channel, an air inlet line connected to an inlet side of the cooling channel of the fuel cell stack, a water injection means provided at the inlet side of the cooling channel to inject water into air introduced to the cooling channel through the air inlet line, and an air compression means provided at the rear of the fuel cell stack and connected to a discharge line coupled to an outlet side of the cooling channel to provide a suction force to the cooling channel and to compress a mixture of air and water vapor sucked from the cooling channel. The present system provides advantages in that the configuration of the fuel cell system is simplified, lightweight, and downsized, and the manufacturing cost is reduced.

16 Claims, 13 Drawing Sheets

FUEL CELL SYSTEM USING EVAPORATIVE COOLING METHOD

CROSS-REFERENCE TO RELATED APPLICATION

This application claims under 35 U.S.C. §119(a) the benefit of Korean Patent Application No. 10-2008-0016618 filed Feb. 25, 2008, the entire contents of which are incorporated herein by reference.

BACKGROUND (a) Technical Field

The present disclosure relates to a fuel cell system using evaporative cooling and a method of cooling the fuel cell system, in which cooling of fuel cell stack and air humidification can be provided by a single air line passing through fuel cell stack.

(b) Background Art

A fuel cell system generates electrical energy by electrochemically converting chemical energy derived from a fuel directly into electrical energy by oxidation of the fuel.

A typical fuel cell system comprises a fuel cell stack for generating electricity by electrochemical reaction, a hydrogen supply system for supplying hydrogen as a fuel to the fuel cell stack, an oxygen (air) supply system for supplying oxygen containing air as an oxidant required for the electrochemical reaction in the fuel cell stack, a thermal management system (TMS) for removing reaction heat from the fuel cell stack to the outside of the fuel cell system, controlling operation temperature of the fuel cell stack, and performing water management function, and a system controller for controlling overall operation of the fuel cell system. The fuel cell system generates heat and water as well as electricity.

One of the most attractive fuel cells for a vehicle is a proton exchange membrane fuel cell or a polymer electrolyte membrane fuel cell (PEMFC), which has the highest power density among known fuel cells. The PEMFC is operated in a low temperature and is able to start up in a short time and has a fast reaction time for power conversion.

The fuel cell stack included in the PEMFC comprises a membrane electrode assembly (MEA), a gas diffusion layer (GDL), a gasket, a sealing member, and a bipolar plate separator. The MEA includes a polymer electrolyte membrane through which hydrogen ions are transported. An electrode/catalyst layer, in which an electrochemical reaction takes place, is disposed on each of both sides of the polymer electrolyte membrane. The GDL functions to uniformly diffuse reactant gases and transmit generated electricity. The gasket functions to provide an appropriate airtightness to reactant gases and coolant. The sealing member functions to provide an appropriate bonding pressure. The bipolar plate separator functions to support the MEA and GDL, collect and transmit generated electricity, transmit reactant gases, transmit and remove reaction products, and transmit coolant to remove reaction heat, etc.

The fuel cell stack is consisted of a plurality of unit cells, each unit cells including an anode, a cathode and an electrolyte (electrolyte membrane). Hydrogen is supplied to the anode ("fuel electrode") and oxygen containing air is supplied to the cathode ("air electrode" or "oxygen electrode").

The hydrogen supplied to the anode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane, and the electrons are transmitted to the cathode through the GDL and the bipolar plate.

At the cathode, the hydrogen ions supplied through the (polymer) electrolyte membrane and the electrons transmitted through the bipolar plate react with the oxygen containing air supplied to the cathode to produce water.

Migration of the hydrogen ions cause electrons to flow through an external conducting wire, which generates electricity and heat.

The electrode reactions in the PEMFC can be represented by the following formulas:

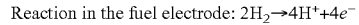
Reaction in the fuel electrode: $2H_2 \rightarrow 4H^+ + 4e^-$

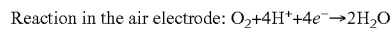
Reaction in the air electrode: $O_2 + 4H^+ + 4e^- \rightarrow 2H_2O$

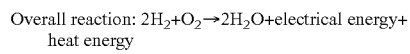
Overall reaction: $2H_2 + O_2 \rightarrow 2H_2O +$ electrical energy+ heat energy In the above reaction, the hydrogen ions permeate the polymer electrolyte membrane, and the membrane permeability of hydrogen is determined by water content of the membrane. As the above reaction proceeds, water is produced and is used to humidify the reactant gases and the membrane.

If the oxygen containing air is dried, the whole quantity of water produced by the reaction is used to humidify the oxygen containing air. As a result, the polymer electrolyte membrane is dried and the hydrogen permeability of the membrane is thus reduced. Meanwhile, if the polymer electrolyte membrane is too much wet, pores of the GDL are clogged, and thus the reactant gases are prevented from getting in contact with the catalyst. For this reason, it is very important to appropriately maintain the water content of the polymer electrolyte membrane.

Moreover, oxygen containing air supplied from atmosphere has a humidity which is not high enough to wet the membrane in an appropriate level. Thus, it is necessary to humidify the air before being supplied to the fuel cell.

In this regard, U.S. Pat. No. 5,700,595 discloses a proton exchange membrane fuel cell device in which porous plate assemblies are used to provide system cooling, reactant humidification, and condensed water collection.

FIG. 1 is a cross-sectional view of the proton exchange membrane fuel cell device disclosed in the patent, and FIG. 2 is a conceptual diagram showing how air and hydrogen are humidified by a coolant and how condensed water produced by fuel cell reaction is pumped in a fuel cell stack employing the porous plate assemblies.

Referring to FIGS. 1 and 2, air and hydrogen are humidified by a coolant flowing through coolant channels 32 and 32', and condensed water generated by a fuel cell reaction is absorbed (collected) by the coolant due to vacuum pressure.

In more detail, the coolant channels 32 and 32' are provided in the middle of porous plates 26 and 26', and air channels 29 and 29' and hydrogen channels 30 and 30' are provided on both sides thereof such that the coolant is circulated through the coolant channels 32 and 32', and the (oxygen containing) air and hydrogen are supplied through the air channels 29 and 29' and the hydrogen channels 30 and 30', respectively.

At this time, the air and hydrogen are supplied at a pressure higher than that of the circulating coolant such that the water generated at the air electrode is pumped to the coolant channels 32 and 32' through the porous plates 26 and 26'.

Since the porous plates 26 and 26' are saturated with the circulating coolant, they serve to humidify the oxidant reactant (air) and fuel reactant (hydrogen), and thus the coolant can perform the operations of cooling and humidifying the system, and removing product water.

However, the fuel cell water management system has the following drawbacks. Since the coolant is condensed and humidified repeatedly, it is necessary to use deionized pure water only; an antifreezing solution cannot be used as the coolant. As the pure water is frozen at a temperature below the freezing point, the water passing through the porous plates is frozen at the air electrode or hydrogen electrode to clog the channels and has thus to be drawn out of the system after operation. The deionized pure water may also be frozen in a water tank and a lot of energy has thus to be used to thaw the frozen water during cold start-up, increasing the start-up time. Furthermore, it is necessary to provide a design that can solve the freezing problem of all components/parts related to the pure water.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a fuel cell system using evaporative cooling that generates electricity by reacting hydrogen as a fuel and air as an oxidant. The system comprises: a fuel cell stack including a cooling channel provided on a bipolar plate separately from an air channel and a hydrogen channel; an air inlet line connected to an inlet side of the cooling channel of the fuel cell stack; a water injection means provided at the inlet side of the cooling channel to inject water into air introduced to the cooling channel through the air inlet line; and an air compression means provided at the rear of the fuel cell stack and connected to a discharge line coupled to an outlet side of the cooling channel to provide a suction force to the cooling channel and to compress a mixture of air and water vapor sucked from the cooling channel. Water is evaporated while air and water pass through the cooling channel in a state where an internal pressure of the cooling channel is maintained at a negative pressure by the suction force of the air compression means and, at the same time, heat generated from the fuel cell stack is absorbed by latent heat of evaporation, thus cooling the fuel cell stack.

In another aspect, the present invention provides a method of cooing a fuel cell system that generates electricity by reacting hydrogen as a fuel and air as an oxidant and includes a fuel cell stack including a cooling channel provided on a bipolar plate separately from an air channel and a hydrogen channel, the method comprising: driving an air compression means provided at the rear of the fuel cell stack and connected to a discharge line coupled to an outlet side of the cooling channel to suck air through an air inlet line connected to an inlet side of the cooling channel; and injecting, by a water injection means provided at the inlet side of the cooling channel, water into the air sucked into the cooling channel through the air inlet line, such that water is evaporated while air and water pass through the cooling channel in a state where an internal pressure of the cooling channel is maintained at a negative pressure by the suction force of the air compression means and, at the same time, heat generated from the fuel cell stack is absorbed by latent heat of evaporation, thus cooling the fuel cell stack It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

The above and other features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
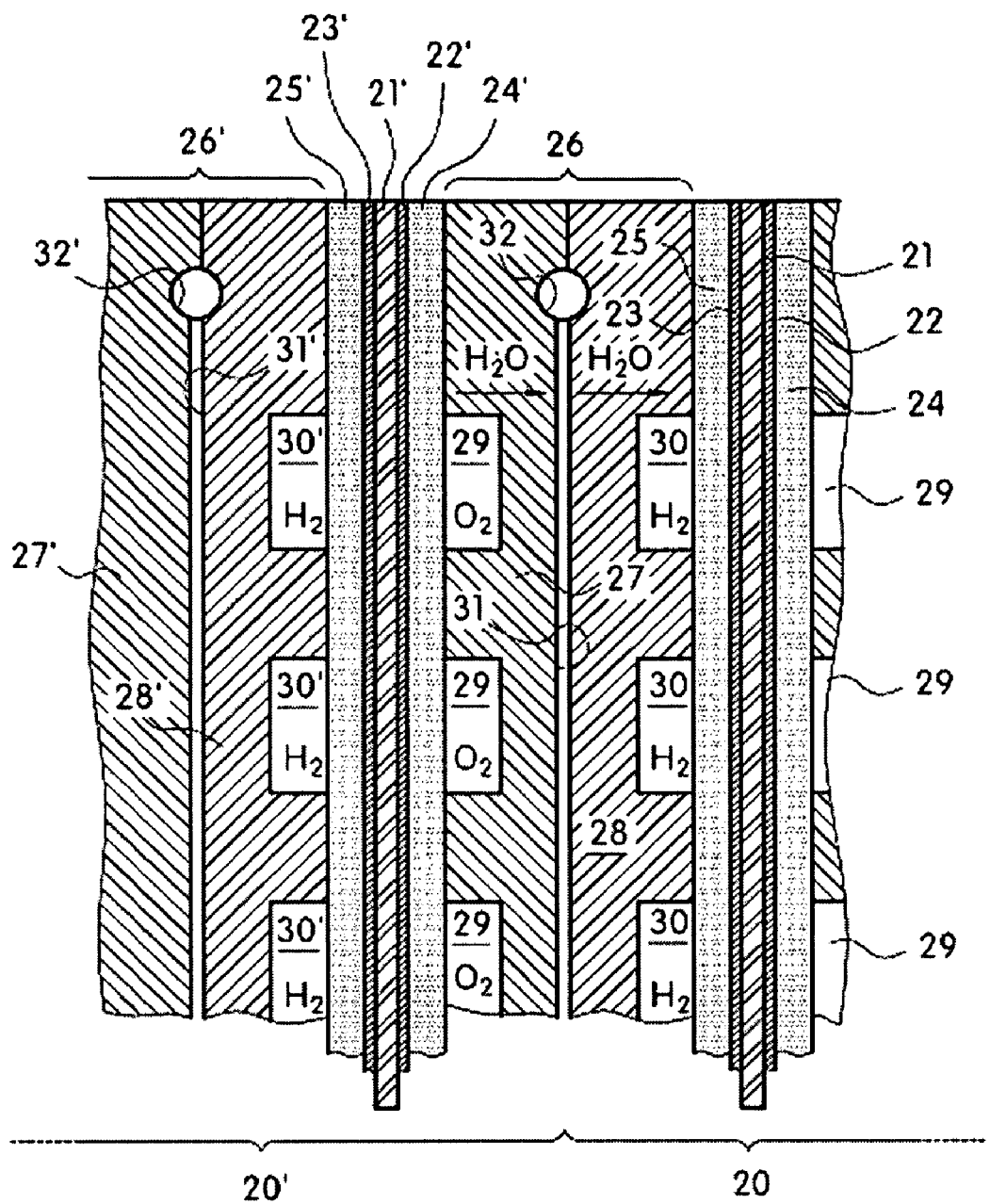
FIG. 1 is a cross-sectional view of a prior art proton exchange membrane fuel cell device.
Figure 2:
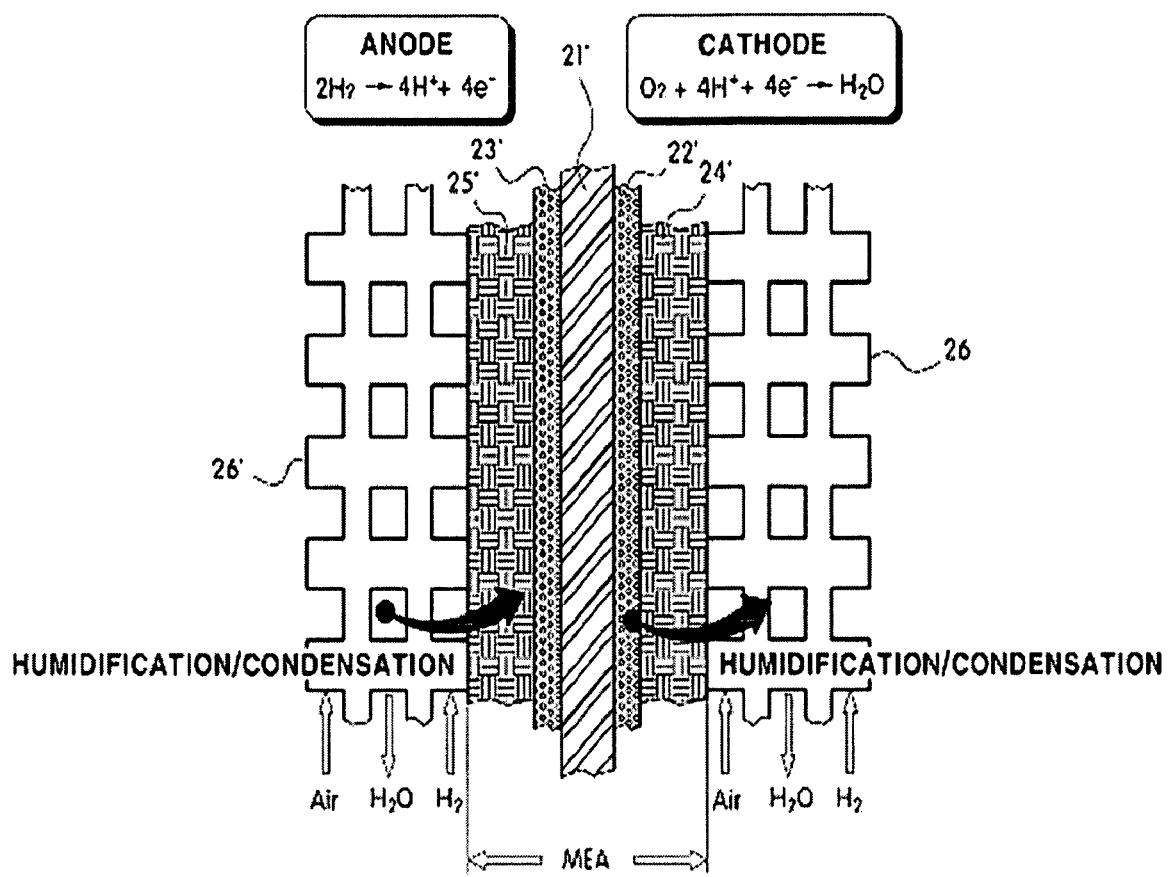
FIG. 2 is a conceptual diagram showing how coolant humidifies air and hydrogen and how condensed water is pumped in the fuel cell device of FIG. 1.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 3:
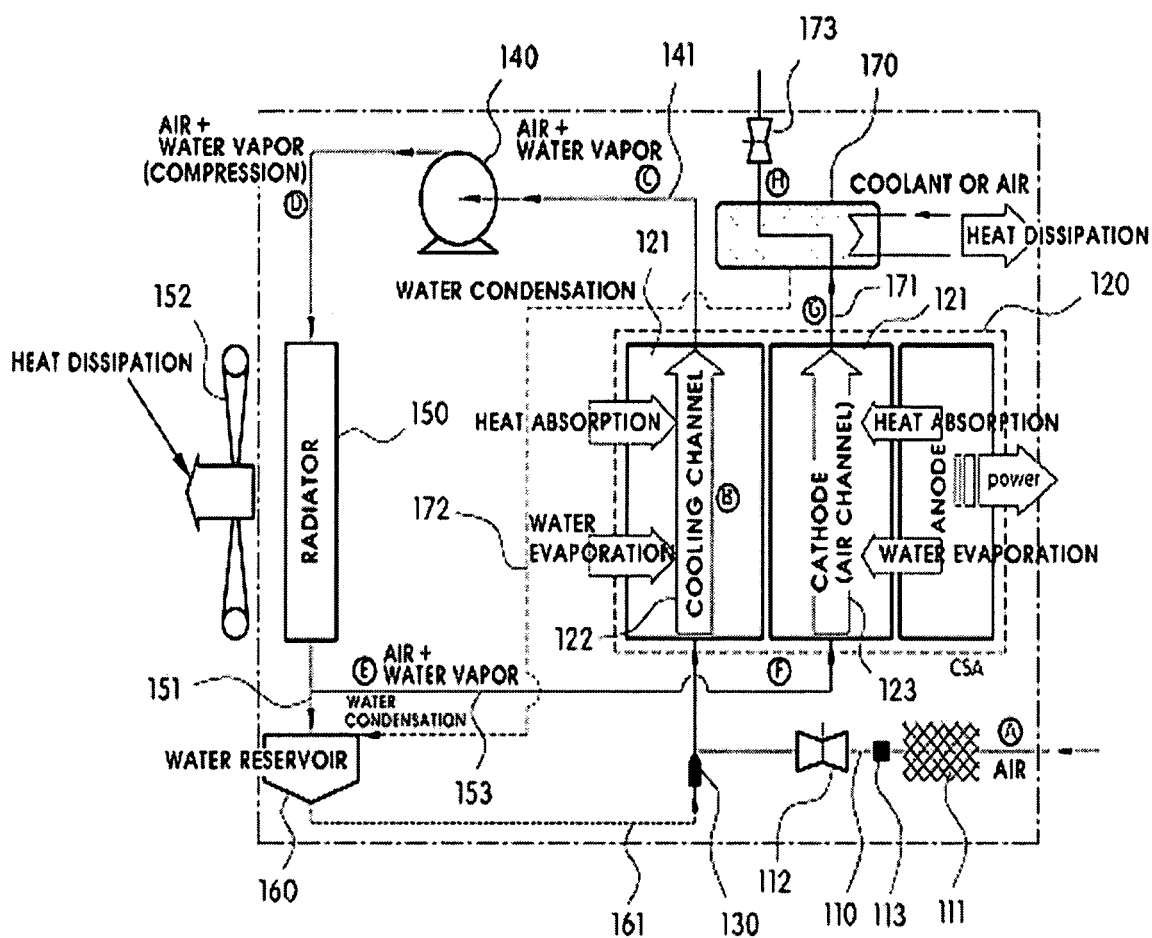
FIG. 3 is a diagram showing the configuration of a fuel cell system in accordance with a preferred embodiment of the present invention.

FIG. 3 is a diagram showing the configuration of a fuel cell system in accordance with a preferred embodiment of the present invention.

As shown in FIG. 3, water is injected into air drawn from the atmosphere using a water injection means 130 at an inlet of a cooling channel 122 provided in a fuel cell stack 120 so that the air mixed with water is supplied to the cooling channel 122. Preferably, in this case, an air compression means 140 provided at a downstream side (rear side) of the fuel cell stack 120 may be driven such that the mixture of water and air passes through the cooling channel 122 by a suction force produced by the air compression means 140.

A high-temperature and low-pressure condition, where water can be easily evaporated, is created in the cooling channel 122 by heat generated from the fuel cell stack 120 and the suction force of the air compression means 140. While the water passing through the cooling channel 122 is evaporated, the fuel cell stack 120 is cooled by the latent heat of evaporation.

Moreover, the air and water vapor discharged from the cooling channel 122 are cooled by a heat dissipation unit 150, and then the humidified air mixed with water vapor discharged from the heat dissipation unit 150 is supplied as an oxidant of the fuel cell stack 120, thus providing the cooling of the fuel cell stack 120 and the air humidification at the same time by a single air line passing through the fuel cell stack 120.

The configuration of the fuel cell system and the air flow in the fuel cell system will be described in more detail with respect to FIG. 3.

The air in the atmosphere is supplied through an air inlet line 110 at an upstream side (front side) connected to the fuel cell stack 120. Here, the air inlet line 110 is connected to an inlet side of the cooling channel 122 provided inside the fuel cell stack 120. Accordingly, the air in the atmosphere may pass through an inlet filter 111 and an inlet valve 112 through the air inlet line 110 and be supplied to the cooling channel 122.

The cooling channel 122 is provided on each of bipolar plates 121, separately from an air channel 123 and a hydrogen channel (not depicted). The inside of the cooling channel 122 is maintained at a vacuum pressure (negative pressure) caused by the suction force produced by the air compression means 140.

A water injection means 130 for receiving water from a water reservoir 160 and injecting the water to the air being supplied through the air inlet line 110 is provided at the inlet side of the cooling channel 122.

The water injection means 130 may include a pump for pumping water in the water reservoir 160 to a high-pressure. It may also include an injector provided at the inlet side of the cooling channel 122 for injecting the water pressurized by the pump.

The water injection means 130 is not particularly limited in the present invention, and any means known in the art may be used as the water injection means 130 as long as it can control the water injection by an electrical control signal output from a fuel cell system controller 101.

A discharge line 141, provided at the downstream side (rear side) of the fuel cell stack 120, through which the mixture of air and water vapor is discharged from the cooling channel 122, is connected to an outlet side of the cooling channel 122. The discharge line 141 is connected to a radiator 150, the heat dissipation unit.

As the air compression means 140, an air blower (or an air pump) for providing a suction force to the inside of the cooling channel 122 is provided in the middle of the discharge line 141.

Preferably, the air blower 140 is disposed at the rear of the cooling channel 122 and sucks air in the cooling channel 122 to maintain the internal pressure of the cooling channel 122 at a low pressure so that water injected into air can be easily evaporated into water vapor.

Like this, with the operation of the air blower 140, the air in the atmosphere is drawn into the inside of the cooling channel 122 through the air inlet line 110 in front of the cooling channel 122 by the suction force of the air blower 140, and thus the internal pressure of the cooling channel 122 is maintained at a vacuum pressure (negative pressure). At this time, an injector, the water injection means 130, injects water in the water reservoir 160 into the air being supplied to the cooling channel 122 so that the air mixed with water is introduced into the inside of the cooling channel 122.

As described above, the high-temperature and low-pressure condition, where water in the air can be easily evaporated, is created in the inside of the cooling channel 122 by the heat generated from the fuel cell stack 120 and the suction force produced by the air blower 140. That is, the temperature is increased by the heat generated from the fuel cell stack 120 and the pressure is reduced by the suction force of the air blower 140. The heat generated from the fuel cell stack 120 increases the evaporation of water passing through the cooling channel 122 and the low pressure caused by the suction force of the air blower 140 increases the absolute humidity of air, thus improving the cooling efficiency. In other words, the heat generated in the fuel cell stack 120 is absorbed by the latent heat of evaporation while the water is evaporated in the cooling channel 122, thereby cooling the fuel cell stack 120 to an appropriate temperature.

Meanwhile, the mixture of air and water vapor (with an intermediate temperature and a low pressure) discharged from the cooling channel 122 of the fuel cell stack 120 by the suction force of the air blower 140 is compressed (to a high temperature and a high pressure) by the air blower 140 and sent to the radiator 150. The air and water vapor are cooled (to an intermediate temperature and a high pressure) by the radiator 150 by outside air during operation of a radiator fan 152 or during operation of the vehicle.

The water is condensed in the radiator 150 while the heat of the mixture of air and water vapor at a high temperature and a high pressure is dissipated to the outside air. As the temperature is reduced and the pressure is increased in the radiator 150, the absolute humidity is lowered and thus the water vapor in the air is condensed into water.

The water condensed in the radiator 150 is moved to the water reservoir 160 connected through a separate pipe 151 provided at an outlet side of the radiator 150, and stored in the water reservoir 160 to be reused by the injector 130 at the inlet side of the cooling channel 122.

The air cooled by the radiator 150 contains water vapor. The water vapor containing air is discharged to an air supply line 153 connected to the air channel 123 formed on the bipolar plate 121 in the fuel cell stack 120 and then supplied to the air channel 123 and a cathode (air electrode) of the fuel cell stack 120 through the air supply line 153 to be reused as an oxidant for the fuel cell reaction.

The air supplied as the oxidant produces water by reacting with hydrogen in the fuel cell stack 120 and is discharged through a discharge line 171. The exhaust gas after the reaction is discharged from the fuel cell stack 120 and then passes through a condenser 170.

The air discharged from the fuel cell stack 120 after the reaction has a temperature increased by absorbing the reaction heat and contains water generated during the reaction. The air discharged from the fuel cell stack 120 is cooled while passing through the condenser 170 using a coolant or air as a refrigerant.

The exhaust gas is cooled by heat exchange with the refrigerant, that is, by dissipating heat to the refrigerant, in the condenser 170. At this time, the water vapor contained in the exhaust gas is condensed into water and discharged to be collected into the water reservoir 160 through a water collection line 172, and the remaining exhaust gas is discharged to the atmosphere through an outlet valve 173 provided at an end of the discharge line 171.

The water collected into the water reservoir 160 is supplied to the injector 130 through a water supply line 161 and reused as water to be injected into the air in the cooling channel 122.

In the above-described fuel cell system, operation conditions that can appropriately control the heat balance and water balance are established by appropriately controlling the opening degrees of the inlet valve 112 and the outlet valve 173, which are control valves, the water injection amount of the injector 130, and the rotational speed (rpm) of the air blower 140.

The inlet valve 112 is used to control the internal pressure of the cooling channel 122 formed on the bipolar plate 121 in the fuel cell stack 120. In a state where the air blower 140 is driven during operation of the fuel cell, the smaller the opening degree of the inlet valve 112, the lower the internal pressure of the cooling channel 122, and the larger the opening degree of the inlet valve 112, the higher the internal pressure of the cooling channel 122.

The outlet valve 173 is related to the control of the amount of water collection of the condenser 170, and is used to control the internal pressure (air pressure) of the air channel 123 of the fuel cell stack 120 and the amount of water collected from the condenser 170 into the water reservoir 160.

To reduce the amount of water collected from the condenser 170 into the water reservoir 160, the opening degree of the outlet valve 173 is increased appropriately. On the other hand, to increase the amount of water collected into the water reservoir 160, the opening degree of the outlet valve 173 is reduced appropriately.

In FIG. 3, reference numeral 113 denotes an air flow sensor. The air flow sensor 113 detects the amount of air supplied through the air inlet line 110 and transmits to the fuel cell system controller 101 an electrical signal in accordance with the detected value. Based on the amount of air detected by the air flow sensor 113, the fuel cell system controller 101 can appropriately control the operation conditions such as the rotational speed of the air blower 140, the opening degree of the inlet valve 112, and the like.

Meanwhile, the following table 1 shows the operation conditions applied to the fuel cell system of FIG. 3 and further the operation states under the operation conditions.

TABLE 1

| | | | |
|---|---|---|---|
| System operation conditions | Output | kW | 100 |
| | Cell voltage | V | 0.7 |
| | Amount of heat generation | kW | 111.429 |
| | Amount of water generation | kg/sec | 0.01334 |
| (A) | Air amount | kg/sec | 0.1 |
| System inlet conditions (Atmosphere) | Pressure | kPa | 100 |
| | Temperature | ° C. | 20 |
| | Relative humidity | RH | 50 |
| | Absolute humidity | w(kg_H$_2$O/kg_air) | 0.0094 |
| (C) | Pressure | kPa | 80 |
| Outlet of cooling channel | Temperature | ° C. | 70 |
| | Relative humidity | RH | 98 |
| | Absolute humidity | w | 0.3861 |
| Amount of water injection | | kg/sec | 0.0377 |
| (B) | Amount of water evaporation | kg/sec | 0.0377 |
| Inside of cooling channel | Latent heat of evaporation | h_fg(kj/kg) | 2280 |
| | Amount of heat absorption | kW | 85.88 |
| (D) | PR | | 2 |
| Outlet of air blower | Outlet pressure | kPa | 160 |
| | Outlet temperature | ° C. | 195.4 |
| | Power consumption | kW | 21.6 |
| (E, F) | Outlet pressure | kPa | 155 |
| Outlet of radiator | Outlet temperature | ° C. | 65 |
| | Relative humidity | RH | 98 |
| | Absolute humidity | w | 0.1157 |
| | Amount of water condensation | kg/sec | 0.0270 |
| | Amount of heat dissipation | kW | 77.5449 |
| (G) | Outlet pressure | kPa | 145 |
| Outlet of air channel | Outlet temperature | ° C. | 70 |
| | Relative humidity | RH | 98 |
| | Absolute humidity | w | 0.1666 |
| | Amount of heat absorption | kW | −7.2140 |
| | Amount of water condensation | kg/sec | 0.0121 |
| | Amount of heat generation | kW | 111.429 |
| (H) | Amount of heat dissipation | kW | 39.5175 |
| Discharge line | Amount of water discharge | kg/sec | 0.0150 |
| System balance | Heat balance (kW) | | −5.634 |
| | Water balance (g/sec) | | 0.00057 |

When the system as shown in FIG. 3 operates under the conditions as shown in Table 1, the heat balance is maintained as (−) and the water balance is maintained as (+), and thus it is possible to operate the system without using any separate humidifier such as a membrane humidifier or any separate cooling loop for cooling the fuel cell stack 120.

As described above, in a state where the internal pressure of the cooling channel 122 formed on each of the bipolar plates 121 is maintained at a low pressure, where water can be easily evaporated using the air blower 140 mounted at the rear of the fuel cell stack 120, water is injected into the air introduced into the cooling channel 122 by the injector 130 so that the mixture of air and water passes through the cooling channel 122. As a result, the water is evaporated in the cooling channel 122, and the heat generated from the fuel cell stack 120 is absorbed by the latent heat of evaporation, thus cooling the fuel cell stack 120.

Moreover, the mixture of air and water vapor passing through the cooling channel 122 of the fuel cell stack 120 is compressed to a high temperature and high pressure state by the air blower 140 at the rear of the fuel cell stack 120, and then cooled by the radiator 150. Subsequently, a portion of the water vapor is condensed and stored in the water reservoir 160 and the humidified air containing the remaining water vapor is supplied to the air channel 123 of the fuel cell stack 120 to be used as the oxidant required for the fuel cell reaction.

Like this, since the cooling of the fuel cell stack 120 is performed using the latent heat of evaporation of the water injected into the air and the air containing water vapor is utilized as the oxidant required for the fuel cell reaction, it is possible to provide the cooling of the fuel cell stack 120 and the air humidification using a single air line without the use of any humidifier or cooling loop required in the conventional methods.

In the above-described fuel cell system, the heat generated in the fuel cell stack 120 may be absorbed while the water in the cooling channel 122 is sufficiently evaporated, and the amount of condensed water collected from the exhaust gas may be appropriately controlled by controlling the operation conditions of the fuel cell stack 120 such as the vacuum pressure (by the air blower 140 and the inlet valve 112) and the temperature of the cooling channel 122, the pressure (by the outlet valve 173) and the temperature of the air channel 123, and the like.

The lower the pressure and the higher the temperature in the inside of the cooling channel 122, the higher the absolute humidity is increased. On the contrary, when the saturated water vapor at a high temperature and a low pressure is pressurized and cooled, the absolute humidity is rapidly lowered even in the same saturated state, and thus the water vapor is condensed into water by the difference.

Using the above principle, when the fuel cell stack 120 is cooled by evaporating water in the cooling channel 122 under the high temperature and low pressure condition and then the saturated air is pressurized and cooled (radiator outlet conditions) while passing through the air blower 140 and the radiator 150, the absolute humidity is rapidly lowered, and thus the water is condensed.

Since the air in this state contains a sufficient amount of water required by the fuel cell stack 120 (i.e., sufficiently humidified), the air drawn through the outlet of the radiator 150 is supplied to the fuel cell stack 120 to be utilized in the fuel cell reaction.

Accordingly, the cooling loop and humidifier as required by the conventional device are not required.

For reference, the heat balance and the water balance in the fuel cell system of the present invention will be described in more detail below. First, the relative humidity RH and the absolute humidity (humidity ratio or specific humidity) can be expressed by the following formulas 1 and 2, respectively:

$$\Phi = Pw/Psat \qquad \text{[Formula 1]}$$

wherein Pw represents a partial pressure of water vapor in the mixture, and Psat represents a saturated water vapor pressure at the same temperature.

$$\omega = Mw/Ma = 0.622 \times (Pw/Pa) = 0.622 \times Pw/(Ptotal - Pw) \qquad \text{[Formula 2]}$$

wherein Mw represents a mass of water contained in the mixture, Ma represents a mass of dry air in the mixture, Pa represents a partial pressure of dry air in the mixture (=Ptotal−Pw), and Ptotal represents a total pressure of the mixture.

The evaporation rate of water is directly proportional to a pressure difference between Pw and Psat [Evaporation rate of water ∝ (Psat−Pw)].

In general, the channel (having a relatively thin cross-section and a large length) of the fuel cell stack 120 provides a very high humidification performance, in which the evaporation is performed up to nearly 100% relative humidity.

In a state where the relative humidity is 100%, when the pressure is not changed and the temperature is increased, the Pw is not changed, but the Psat (a function only for the temperature) is increased to reduce the relative humidity below 100%. Contrarily, when the pressure is not changed and the temperature is lowered, the Pw is not changed, but the Psat is lowered to maintain the 100% relative humidity, and thus the water is condensed.

Meanwhile, the absolute humidity is a function representing the mass of water contained in dry air having a constant mass and can significantly vary in accordance with the temperature and pressure even though the relative humidity is constant.

That is, even in the condition of 100% relative humidity (the relative humidity is close to nearly 100% while the air passes through the fuel cell stack or cooling channel), the higher the temperature and the lower the pressure, the more the value of the absolute humidity is increased.

For example, under a condition where the temperature is 70° C. and the relative humidity is 100%, when the pressure is changed from 100 kPa_abs to 90 kPa_abs, the absolute humidity is changed from 0.2814 kg_$H_2O$/kg_air to 0.3292 kg_$H_2O$/kg_air (increased by 17%). On the other hand, under a condition where the relative humidity is 100% and the pressure is 100 kPa_abs, when the temperature is changed from 60° C. to 70° C., the absolute humidity is changed from 0.15474 kg_$H_2O$/kg_air to 0.2814 kg_$H_2O$/kg_air (increased by 82%).

Figure 4:
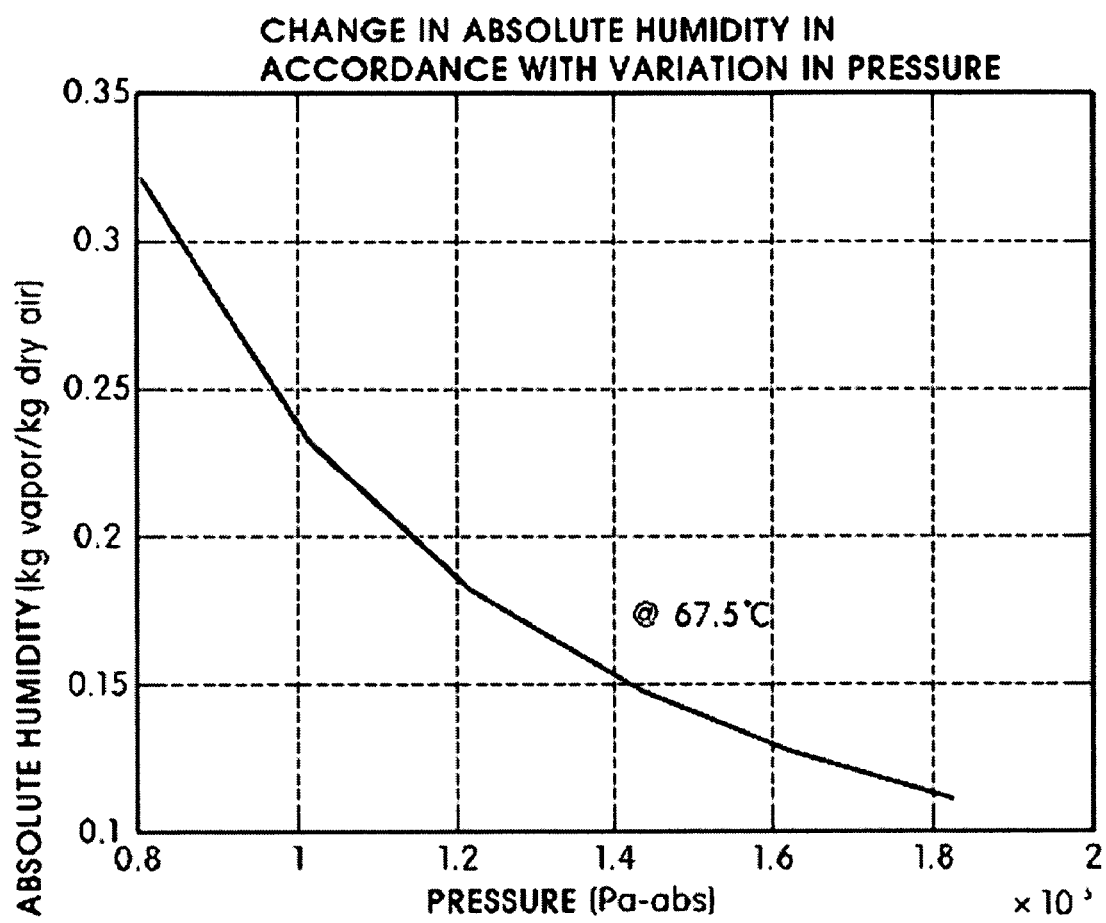
FIGS. 4 and 5 are graphs illustrating changes in absolute humidity in accordance with variations in temperature and pressure.
Figure 5:
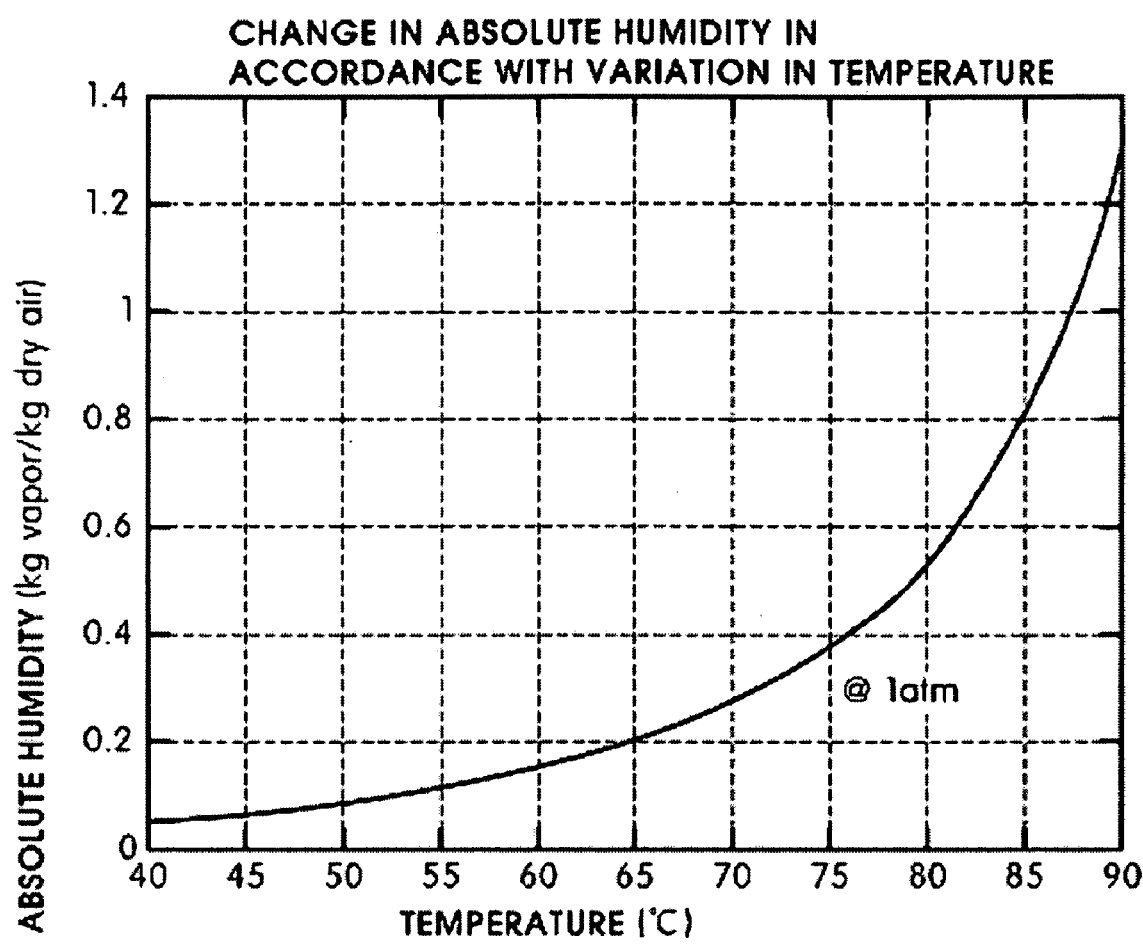

FIG. 4 shows a change in absolute humidity in accordance with a variation in pressure at 67.5° C., and FIG. 5 shows a change in absolute humidity in accordance with a variation in temperature at 1 atm.

As can be seen from FIGS. 4 and 5, the higher the temperature of air and the lower the pressure of air, the more the value of the absolute humidity is increased, which means that it is possible to adjust the amount of water vapor that the air can contain by adjusting the pressure and temperature even though the amount of air is the same.

Accordingly, when the temperature and pressure in the cooling channel 122 of the fuel cell stack 120 are appropriately controlled in the manner provided by the present invention, it is possible to cool the fuel cell stack 120 using the evaporation of water injected into the air. Moreover, it is possible to realize a system in which the air humidified with water vapor in the cooling channel 122 is supplied to the cathode (air electrode) of the fuel cell stack 120 to be utilized in the fuel cell reaction.

Figure 6:
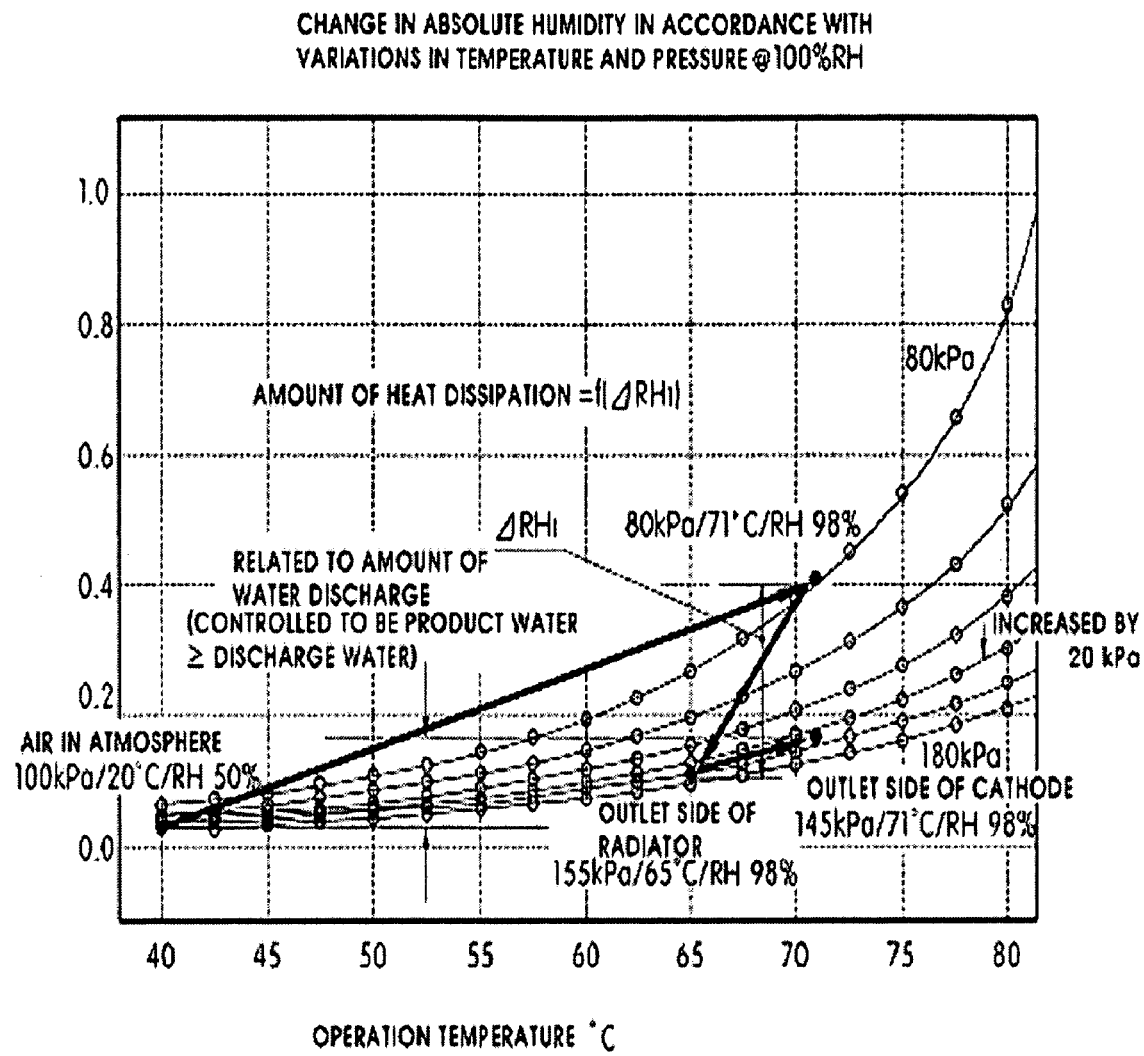
FIG. 6 is a graph illustrating change in absolute humidity of air according to temperature and pressure in accordance with a preferred embodiment of the present invention.

FIG. 6 is a graph illustrating change in absolute humidity of air according to temperature and pressure with respect to positions (i.e., the air in the atmosphere, the air at the outlet side of the cooling channel, the air at the outlet side of the radiator, and the air at the outlet side of the air channel (cathode) of the fuel cell stack).

Referring to FIG. 6, during operation of the air compression means (air blower), the air in the atmosphere (100 kPa/ 20° C./RH 50%) together with the water injected by the injector at the inlet side of the cooling channel are sucked into the cooling channel of the fuel cell stack and pass therethrough. In a state where the inside of the cooling channel is maintained at a low pressure by the suction force of the air compression means, the water mixed in the air is evaporated to absorb the heat of the fuel cell stack, and then the mixture of water vapor and air at an intermediate temperature and a low pressure (80 kPa/71° C./RH 98%) is discharged through the outlet of the cooling channel.

Like this, under the condition where the pressure is maintained at a low pressure by applying the heat generated from the fuel cell stack (generated by the fuel cell reaction) and the suction force of the air compression means, the water injected into the air is evaporated and thus the heat of the fuel cell stack is absorbed by the latent heat of evaporation, thus cooling the fuel cell stack. Moreover, when the air mixed with water vapor absorbing the heat is discharged through the outlet of the cooling channel, the temperature of air is increased, but the pressure is lowered, and thus the absolute humidity is increased higher than that of the air in the atmosphere.

Subsequently, when the air is compressed to a high temperature and high pressure state by the air compression means and then moved to the radiator to be cooled (heat dissipated), the air at an intermediate temperature and a high pressure (155 kPa/65° C./RH 98%) is discharged through the outlet of the radiator. At this time, since the temperature is lowered and the pressure is increased, the absolute humidity is significantly lowered.

Then, a portion of the condensed water is moved to the water reservoir and stored, and the air containing the remaining water vapor in a sufficiently humidified state is supplied to the cathode of the fuel cell stack to be used as the oxidant in the fuel cell reaction.

Moreover, the air at an intermediate temperature and a high pressure (145 kPa/71° C./RH 98%) remaining after passing through the cathode of the fuel cell stack and used as the oxidant is discharged to the condenser through the outlet of the air channel (cathode). Subsequently, when the water vapor is condensed while the heat dissipation is performed by a coolant or air in the condenser, the condensed water is moved to the water reservoir and stored and, at the same time, the remaining air is discharged to the atmosphere through the outlet valve.

At this time, since the difference between the absolute humidity of the air in the atmosphere and that of the air discharged through the outlet of the cathode (air channel) is related to the amount of water discharge, it is controlled such that the amount of product water is equal to or greater than the amount of discharge water (product water≧discharge water).

As can be seen from FIG. 6, the absolute humidity is changed in accordance with variations in temperature and pressure of air with respect to positions, which means that it is possible to adjust the amount of water vapor (water) that the air can contain by controlling the pressure and temperature even though the amount of air is the same.

Moreover, it can be understood that the air at the outlet side of the cooling channel has a higher temperature and a lower pressure than those of the air in the atmosphere and further the absolute humidity is rapidly increased. This means that the heat generated in the fuel cells stack is absorbed by fluid passing through the cooling channel by the latent heat of evaporation of water in the cooling channel.

With this, while the air containing a large amount of water vapor at the outlet side of the cooling channel is cooled by the heat dissipation of the radiator, a portion of water vapor is condensed and separated, and the humidity is appropriately controlled by the remaining water vapor. As a result, the thus sufficiently humidified air is supplied to the cathode of the fuel cell stack to be used as the oxidant in the fuel cell reaction.

As above, when the air mixed with water injected by the injector passes through the cooling channel of the fuel cell stack, the fuel cell stack can be cooled by the latent heat of evaporation of the water.

Moreover, when the air mixed with water vapor after cooling the fuel cell stack passes through the radiator to dissipate the heat, the humidified air with the adjusted amount of water vapor can be supplied as the oxidant required for the fuel cell stack.

As a result, it is possible to achieve the cooling of the fuel cell stack and the air humidification at the same time while maintaining the heat balance and the water balance in the fuel cell system by an air line extending from the cooling channel of the fuel cell stack to the condenser via the air compression means, the radiator, the air channel of the fuel cell stack without using any separate cooling loop for cooling the fuel cell stack or any separate humidifier for the air humidification.

Like this, it is possible to appropriately control the temperature and pressure of the air (cause a change in absolute humidity) at the cooling channel of the fuel cell stack, the radiator, and the air channel of the fuel cell stack, using only the air required in the fuel cell system. Moreover, it is possible to achieve the heat removal of the fuel cell stack and the humidification of air required for the fuel cell reaction at the same time using the evaporation and condensation of water.

Especially, the air blower (or air pump), the air compression means, is arranged at the rear of the cooling channel of the fuel cell stack so that the internal pressure of the cooling channel is maintained at a vacuum pressure (negative pressure). As a result, the water supplied to the cooling channel can be easily evaporated and thus a sufficient evaporation is obtained only with the air required for the fuel cell reaction, thus achieving the heat dissipation and cooling of the fuel cell stack at the same time without any air supply. As can be seen from formula 2, the amount of water dissipation related to the degree of heat absorption of the fuel cell stack is increased as much as the pressure of the cooling channel is reduced.

Moreover, the radiator is disposed at the rear of the air blower so that the mixture of air and water vapor introduced into the radiator is supplied with an increased temperature and pressure. Then, the air is cooled by the radiator by outside air, and the pressure is maintained at a pressure higher than the atmospheric pressure, which is similar to the outlet pressure of the air blower, and thus the relative humidity exceeds 100%. That is, the relative humidity exceeding 100% means that the air is condensed into water. It is possible to maximize the water condensation effect with the drop in temperature as well as the increase in pressure in the radiator (Ptotal↑, Pw↑ in formula 2), and the reason for this is that an efficient condensation can be obtained only with the air required for the fuel cell reaction.

Also, the mixture of air and water vapor supplied from the radiator to the air channel (cathode) of the fuel cell stack produces water by reacting with hydrogen and is then discharged from the fuel cell stack. At this time, the water contained in the exhaust gas is condensed and collected by the condenser, and the condensed water is sent to the water reservoir 160 and reused as water to be injected into the air in the cooling channel.

Consequently, when the fuel cell system is configured as described above, although the condenser and the injector are added, a humidifier, a water pump (including a controller) for cooling the fuel cell stack, a thermostat, a coolant discharge loop, and the like are not required, and thus it is possible to simplify the system and reduce the manufacturing cost. Moreover, since the fuel cell system of the present invention does not use coolant, it is possible to reduce the heat load during cold start-up of the fuel cell system.

Figure 7:
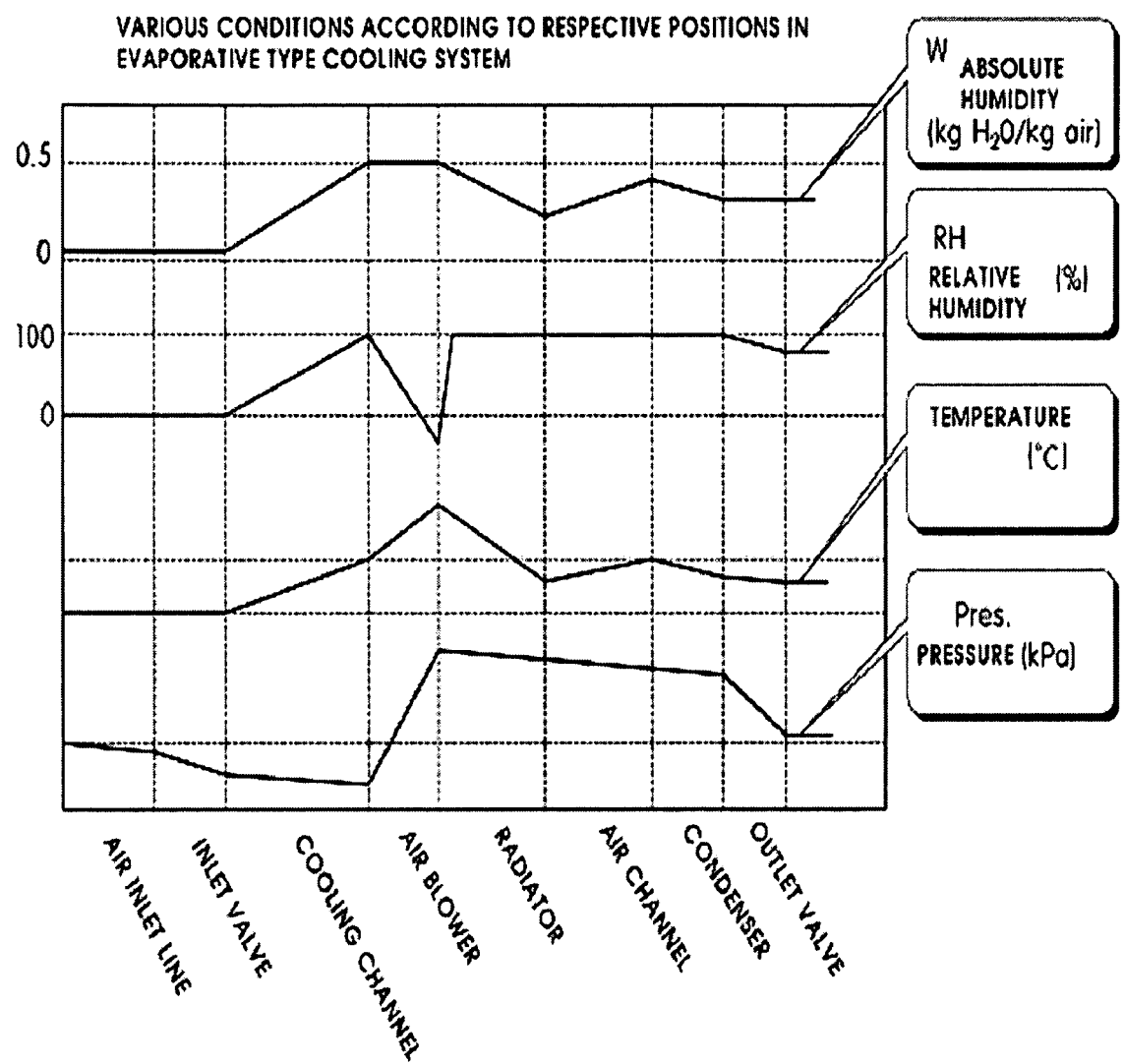
FIG. 7 is a graph illustrating states of air according to position thereof in accordance with a preferred embodiment of the present invention.
Figure 8:
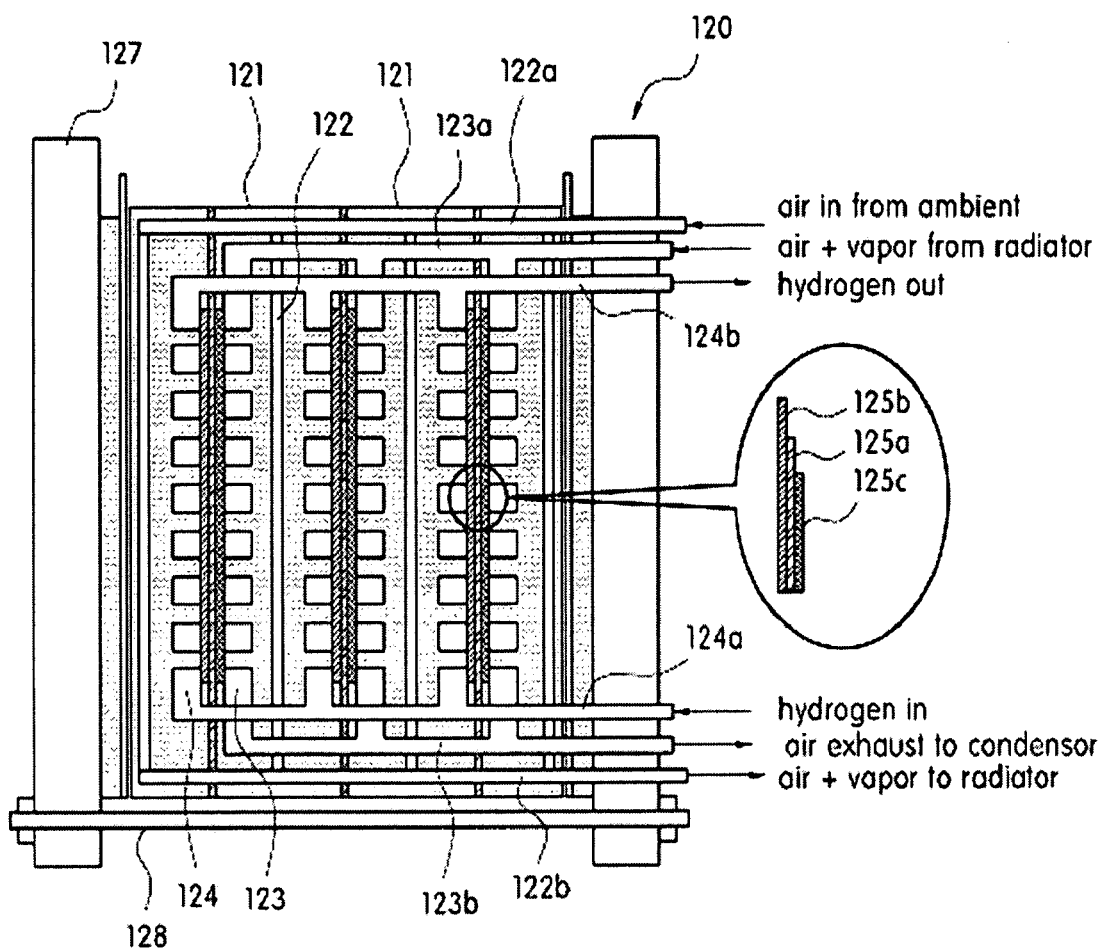
FIG. 8 is a cross-sectional view of the fuel cell stack in a fuel cell system in accordance with a preferred embodiment of the present invention.
Figure 9:
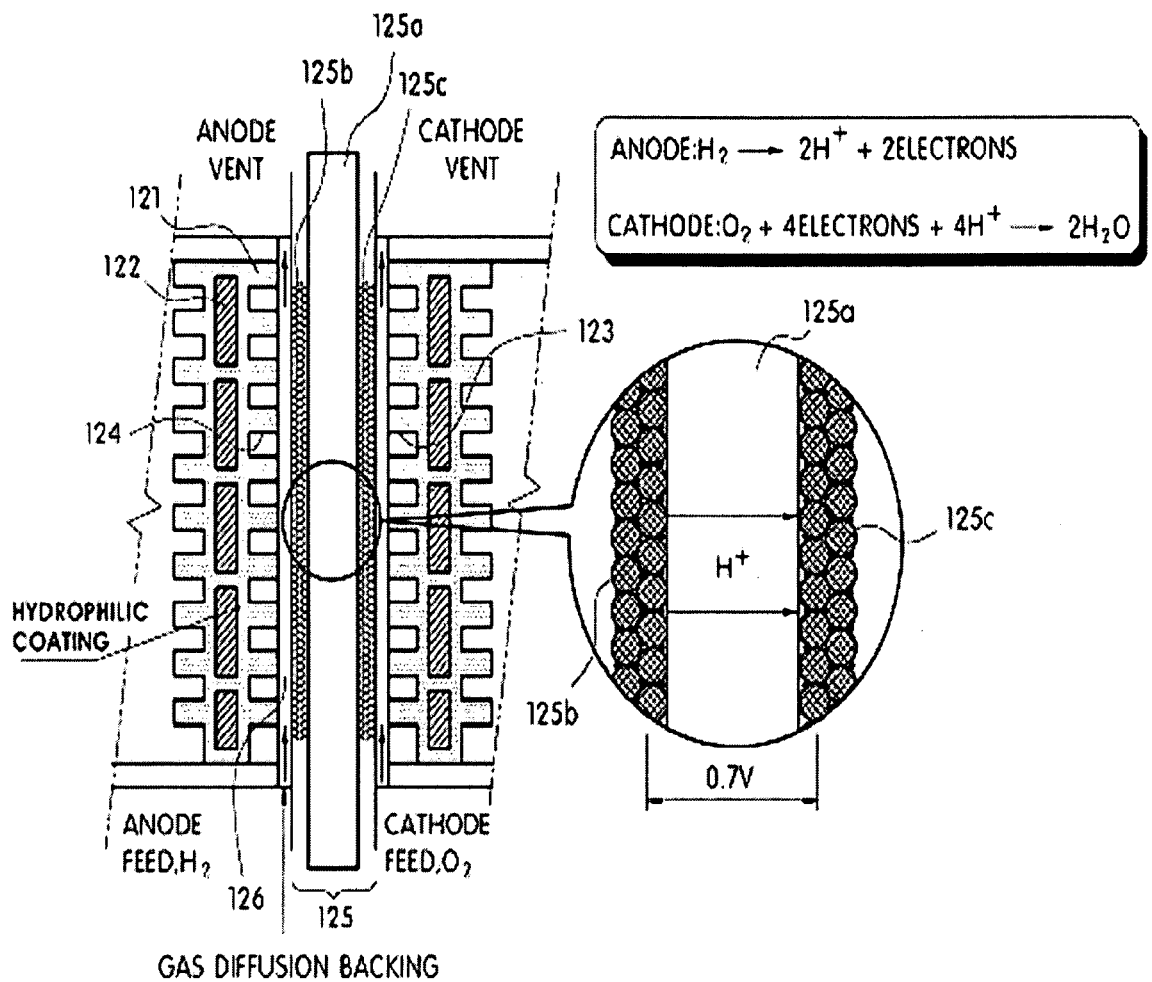
FIG. 9 is a transverse cross-sectional view of the fuel cell stack in a fuel cell system in accordance with a preferred embodiment of the present invention.

FIG. 7 is a graph illustrating states of air according to position thereof in accordance with a preferred embodiment of the present invention. FIG. 8 is a cross-sectional view of the fuel cell stack in a fuel cell system in accordance with a preferred embodiment of the present invention. FIG. 9 is a transverse cross-sectional view of the fuel cell stack in a fuel cell system in accordance with a preferred embodiment of the present invention. In FIG. 9, a connection portion between two bipolar plates 121 assembled with an MEA 125 and a GDL 126 interposed therebetween is shown in detail, in which the ion and electron transfer between the anode 125b and the cathode 125c is shown in the right circle. In the figures, reference numeral 125a denotes an electrolyte membrane, 125b and 125c denote electrodes attached to the electrolyte membrane 125a, i.e., an anode 125b and a cathode 125c, respectively.

As shown in the figures, the fuel cell stack 120 has a structure in which a plurality of bipolar plates 121 are stacked with the MEA 125 and the GDL 126 interposed therebetween and then assembled by end plates 127 and a tie rod 128.

The air channel 123 through which air as an oxidant flows and the hydrogen channel 124 through which hydrogen as a fuel flows are provided on each of the bipolar plates 121. Moreover, the cooling channel 122, through which the air in the atmosphere mixed with the water injected by the injector passes to cool the fuel cell stack 120, is provided.

Here, when the air in the atmosphere mixed with the water injected by the injector is introduced through an inlet manifold 122a of the fuel cell stack 120 by the suction force of the air compression means 140, the air is then distributed to the cooling channel 122 of each of the bipolar plates 121 to cool the fuel cell stack 120 and discharged through an outlet manifold 122b as the mixture of air and water vapor. Subsequently, the discharged mixture is compressed by the air compression means 140 and then moved to the radiator 150.

Moreover, when the humidified air (air+water vapor) discharged from the radiator 150 is supplied through an inlet manifold 123a of the fuel cell stack 120, the air is then distributed to the air channel 123 of each of the bipolar plates 121 and supplied to the cathode 125c, and the exhaust gas (air+water vapor) passing through the air channel 123 and the cathode 125c is discharged through an outlet manifold 123b and moved to the condenser 170.

When the hydrogen used as the fuel is supplied through an inlet manifold 124a of the fuel cell stack 120, the hydrogen is then distributed to the hydrogen channel 124 of each of the bipolar plates 121 and supplied to the anode 125b, and the hydrogen passing through the hydrogen channel 124 and the anode 125b is discharged through an outlet manifold 124b.

As described above, the heat generated from the fuel cell stack is absorbed while the water injected by the injector and mixed with air is evaporated in the inside of the cooling channel 122 on each of the bipolar plates 121 of the fuel cell stack 120. In this case, if a hydrophilic coating is formed on the inner surface of the cooling channel 122, the evaporation rate is maximized and thus a sufficient evaporation is achieved.

The cooling channel 122 corresponds to a suction part of the air blower 140 disposed at the rear of the fuel cell stack 120 as shown in FIG. 3 and corresponds to a portion where the vacuum pressure is created, and the inner surface of the cooling channel 122 is subjected to a hydrophilic coating process to maximize the water evaporation and the cooling of the fuel cell stack due to the water evaporation.

Figure 10:
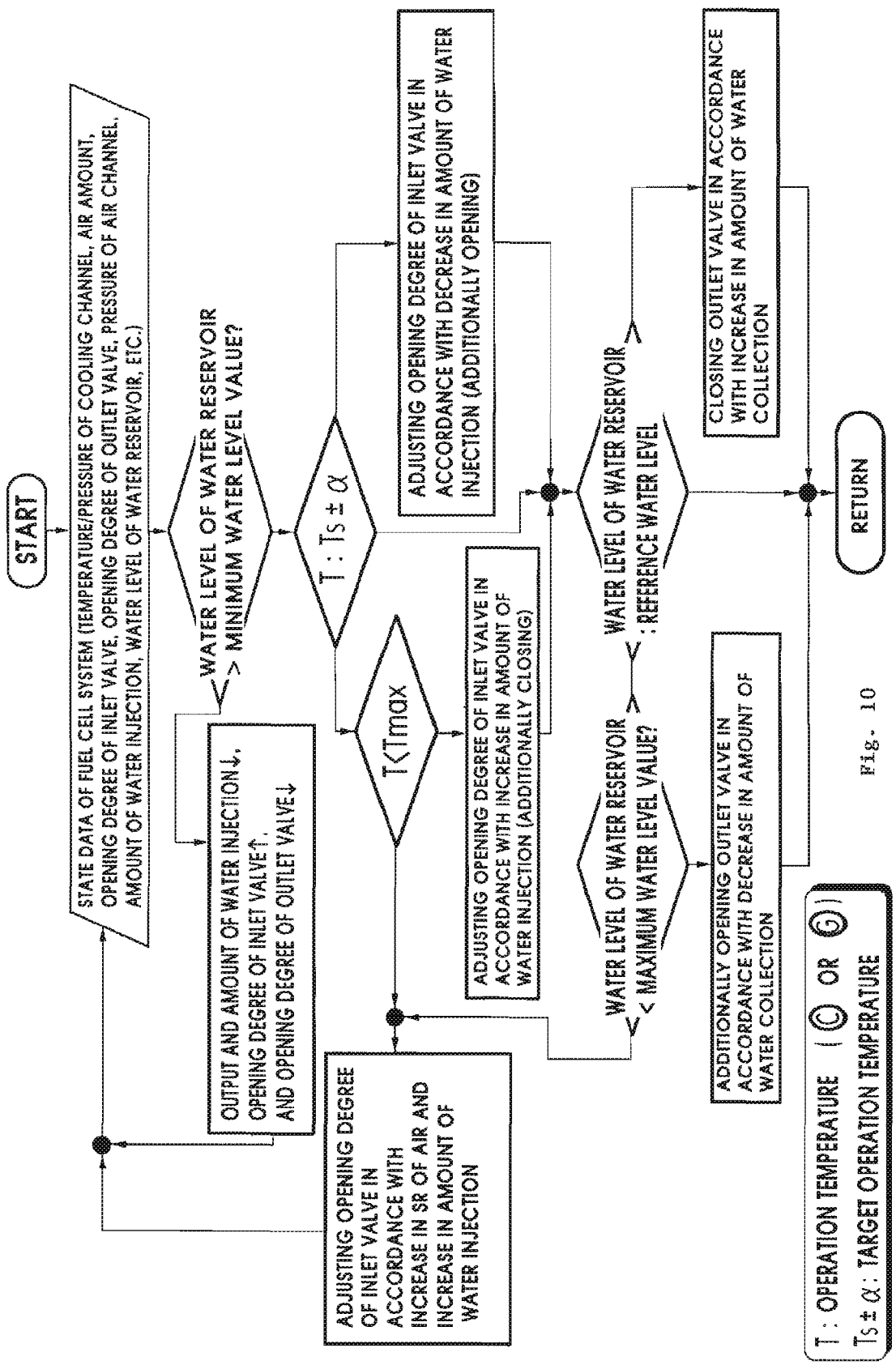
FIG. 10 is a flowchart illustrating a method of controlling respective constituent elements for cooling a fuel cell system in accordance with a preferred embodiment of the present invention.
Figure 11:
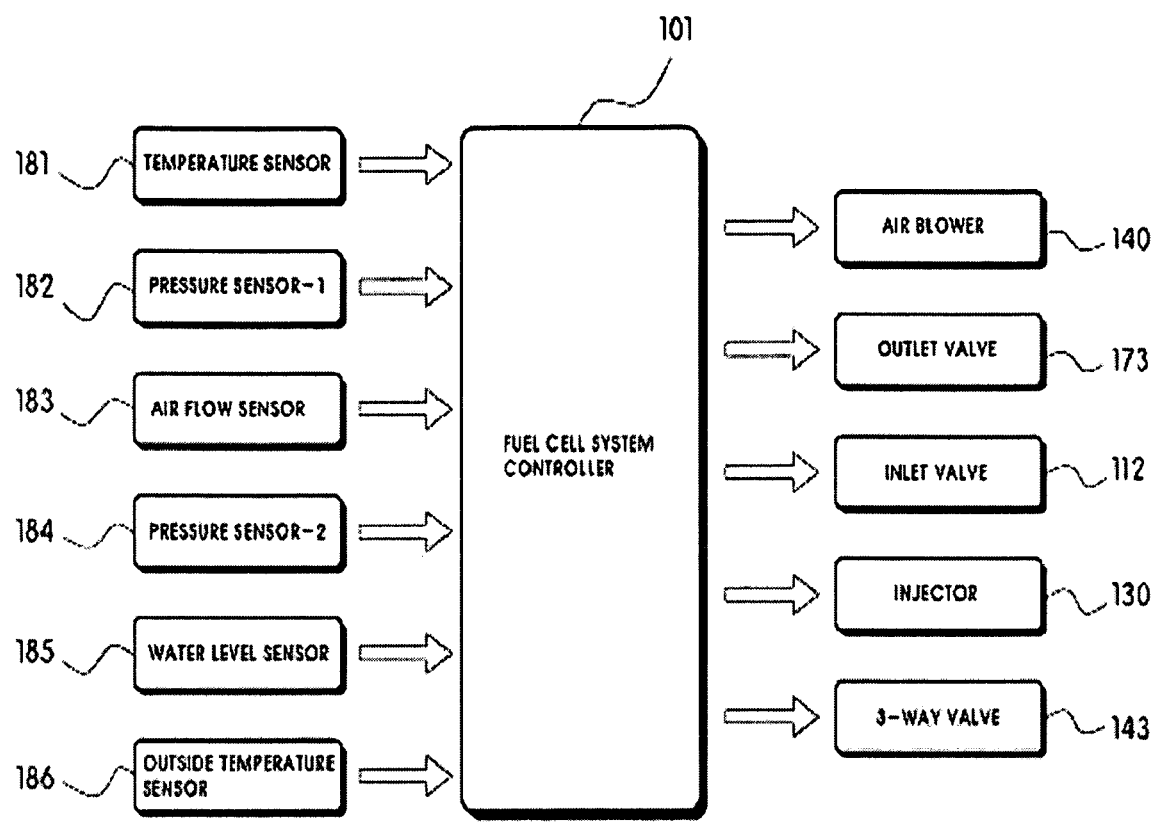
FIG. 11 is a block diagram showing the configuration of a fuel cell cooling system in accordance with a preferred embodiment of the present invention.

FIG. 10 is a flowchart illustrating a method of controlling respective constituent elements for cooling a fuel cell system in accordance with a preferred embodiment of the present invention. FIG. 11 is a block diagram showing the configuration of a fuel cell cooling system in accordance with a preferred embodiment of the present invention.

According to the present invention, it is possible to facilitate the control of the fuel cell system by appropriately adjusting the operation temperature and pressure in accordance with the system load and external conditions and by reducing the control elements with the control of the operation speed of the air compression means (air blower or air pump).

First, as shown in FIG. 11, the fuel cell system controller 101 receives state data of the fuel cell system from respective input units such as sensors, and controls drive units such as the air blower 140, the outlet valve 173, the inlet valve 112, and the injector 130.

Here, the input units may include a temperature sensor 181 for detecting an outlet temperature of the cooling channel (or outlet temperature of the air channel) in the fuel cell stack, a cooling channel pressure sensor 182 for detecting an outlet pressure of the cooling channel, an air flow sensor 113 provided on the air inlet line to detect an amount of air supplied to the cooling channel, an air channel pressure sensor 183 for detecting an outlet pressure of the air channel (cathode) in the fuel cell stack, and a water level sensor 184 for detecting a water level of the water reservoir.

In the example of FIG. 10, the fuel cell system controller 101 receives state data of the fuel cell system such as detection values from the respective sensors (S109), and controls the respective drive units based on input data such as the current outlet temperature of the cooling channel, the current outlet pressure of the cooling channel, the current amount of air supplied to the cooling channel, the current outlet pressure of the air channel (cathode), the current water level of the water reservoir, the current opening degrees of the inlet valve and the outlet valve, the current amount of water injection of the injector, and the like.

If the current water level of the water reservoir 160 is below a predetermined minimum water level value based on a signal from the water level sensor 184, the fuel cell system controller 101 reduces the output of the fuel cell stack 120 and the amount of water injection of the injector 130, opens the inlet valve 112 a little more and, at the same time, closes the outlet valve 173 a little more (S110, S111). That is, the fuel cell system controller 101 increases the water level of the water reservoir 160 by increasing the amount of water collected from the condenser 170 into the water reservoir 160 and, at the same time, by reducing the amount of water injection.

On the other hand, if the current water level of the water reservoir 160 is in a normal state exceeding the minimum water level value, the fuel cell system controller 101 compares the outlet temperature (T) of the cooling channel 122, which is the current operation temperature, with a target operation temperature (Ts±α) based on a signal from the temperature sensor 181 (S120).

Here, if the current outlet temperature of the cooling channel 122 exceeds the target operation temperature (T>Ts±α), the fuel cell system controller 101 compares the outlet temperature (T) of the cooling channel 122 with a predetermined maximum temperature value (Tmax) (S121). If it is below the maximum temperature (T<Tmax), the fuel cell system controller 101 reduces the pressure in the cooling channel 122 by increasing the amount of water injection of the injector 130 and, at the same time, by reducing the opening degree of the inlet valve 112 in accordance with the increase in the amount of water injection (S123). That is, the water evaporation is increased by increasing the amount of water to be mixed with the air in the cooling channel 122 and by reducing the pressure in the cooling channel 122, and thus the outlet temperature of the cooling channel 122 is lowered in accordance with the target operation temperature.

On the contrary, if the outlet temperature of the cooling channel 122 is equal to or higher than the maximum temperature (T≧Ts±α), the fuel cell system controller 101 increases the stoichiometric ratio (SR) of air and increases the amount of water injection of the injector 130 by increasing the rotational speed of the air blower 140, and at the same time reduces the opening degree of the inlet valve 112 in accordance with the increase in the amount of water injection (S122).

Moreover, in the state where the current water level of the water reservoir 160 is higher than the minimum water level value, if the current outlet temperature of the cooling channel 122 is below the target operation temperature (T<Ts±α), the fuel cell system controller 101 reduces the amount of water injection of the injector 130 and increases the opening degree of the inlet valve 112 in accordance with the reduction in the amount of water injection (S124). That is, the water evaporation is reduced by reducing the amount of water to be mixed with the air in the cooling channel 122 and by increasing the pressure in the cooling channel 122, and thus the outlet temperature of the cooling channel 122 is increased in accordance with the target operation temperature.

And, in the state where the current water level of the water reservoir 160 is higher than the minimum water level value, if the current outlet temperature of the cooling channel 122 is equal to the target operation temperature (T=Ts±α), the fuel cell system controller 101 compares the current water level of the water reservoir 160 with a predetermined reference water level base on a signal from the water level sensor 184 (S130).

Then, if the current water level of the water reservoir 160 exceeds the reference water level, the fuel cell system controller 101 compares the current water level of the water reservoir 160 with a predetermined maximum water level value (S131). If it is below the maximum water level value, the fuel cell system controller 101 increases the opening degree of the outlet valve 173 to reduce the amount of water collection (S132). That is, the amount of water collected from the condenser 170 into the water reservoir 160 is reduced and the water level of the water reservoir 160 is lowered in accordance with the reference water level by increasing the opening degree of the outlet valve 173 to increase the amount of water discharged to the atmosphere.

Contrarily, if the current water level of the water reservoir 160 is higher than the maximum water level value, the fuel cell system controller 101 increases the stoichiometric ratio of air and the amount of water injection of the injector 130 by increasing the rotational speed of the air blower 140 and, at the same time, reduces the opening degree of the inlet valve 112 in accordance with the increase in the amount of water injection (S122).

Moreover, if the current water level of the water reservoir 160 is below the reference water level, the fuel cell system controller 101 reduces the opening degree of the outlet valve 173 to increase the amount of water collection (S133). That is, the water level of the water reservoir 160 is increased in accordance with the reference water level by reducing the opening degree of the outlet valve 173 to increase the amount of water collected from the condenser 170 into the water reservoir 160.

Figure 12:
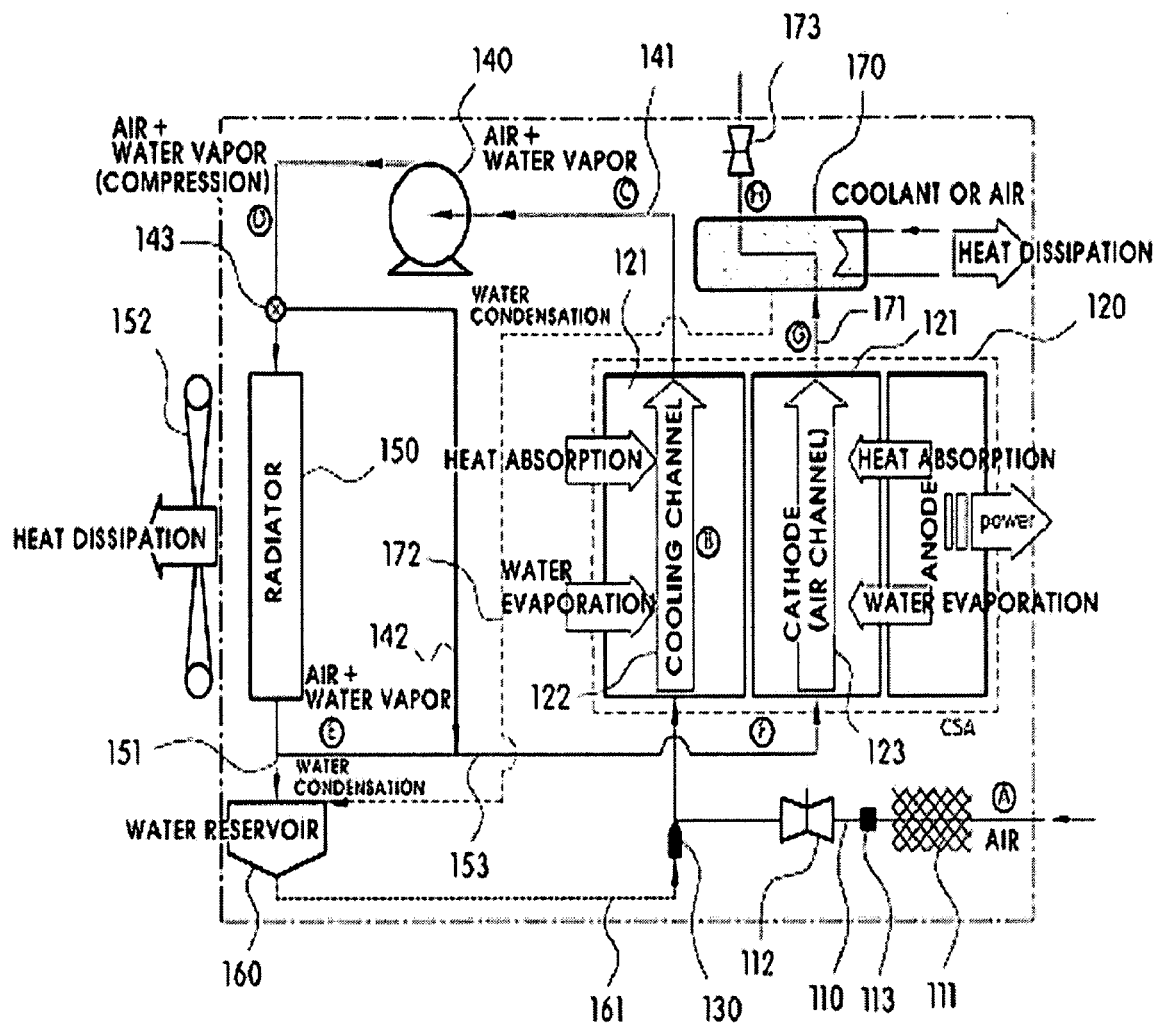
FIG. 12 is a diagram showing the configuration of a fuel cell system in which a bypass line provided in accordance with a preferred embodiment of the present invention.

Meanwhile, FIG. 12 is a diagram showing the configuration of a fuel cell system in accordance with a preferred embodiment of the present invention, in which the mixture of air and water vapor passing through the air blower is not passed through the radiator but bypassed.

As shown in the figure, a bypass line 142, branched off from the discharge line 141 in front of the radiator 150 and connected to the air supply line 153, is additionally provided, and a valve, for example, a 3-way valve 143 is provided at a position where the bypass line 142 is branched off from the discharge line 141.

The 3-way valve 143 is operated by a control signal of the fuel cell system controller 101 to partially open an inlet of the bypass line 142. When the fuel cell system controller 101 determines that the outside air temperature is as low as below the reference temperature based on a signal from an outside temperature sensor 185 as shown in FIG. 11, it operates the 3-way valve 143 to partially open the inlet of the bypass line 142.

That is, if the outside air temperature is low, the fuel cell system controller 101 partially opens the inlet of the bypass line 142 to bypass a portion of the mixture of air and water vapor discharged from the air blower 140 such that the bypassed mixture joins the mixture passing through the radiator 150 and is then supplied to the air channel 123 (cathode) of the fuel cell stack 120.

Like this, since a portion of the humidified air is not passed through the radiator 150 but bypassed to be mixed with the humidified air passing through the radiator 150, it is possible to prevent the humidified air from being overcooled and, at the same time, it is possible to supply the humidified air at an appropriate temperature to the air channel 123 of the fuel cell stack 120.

Figure 13:
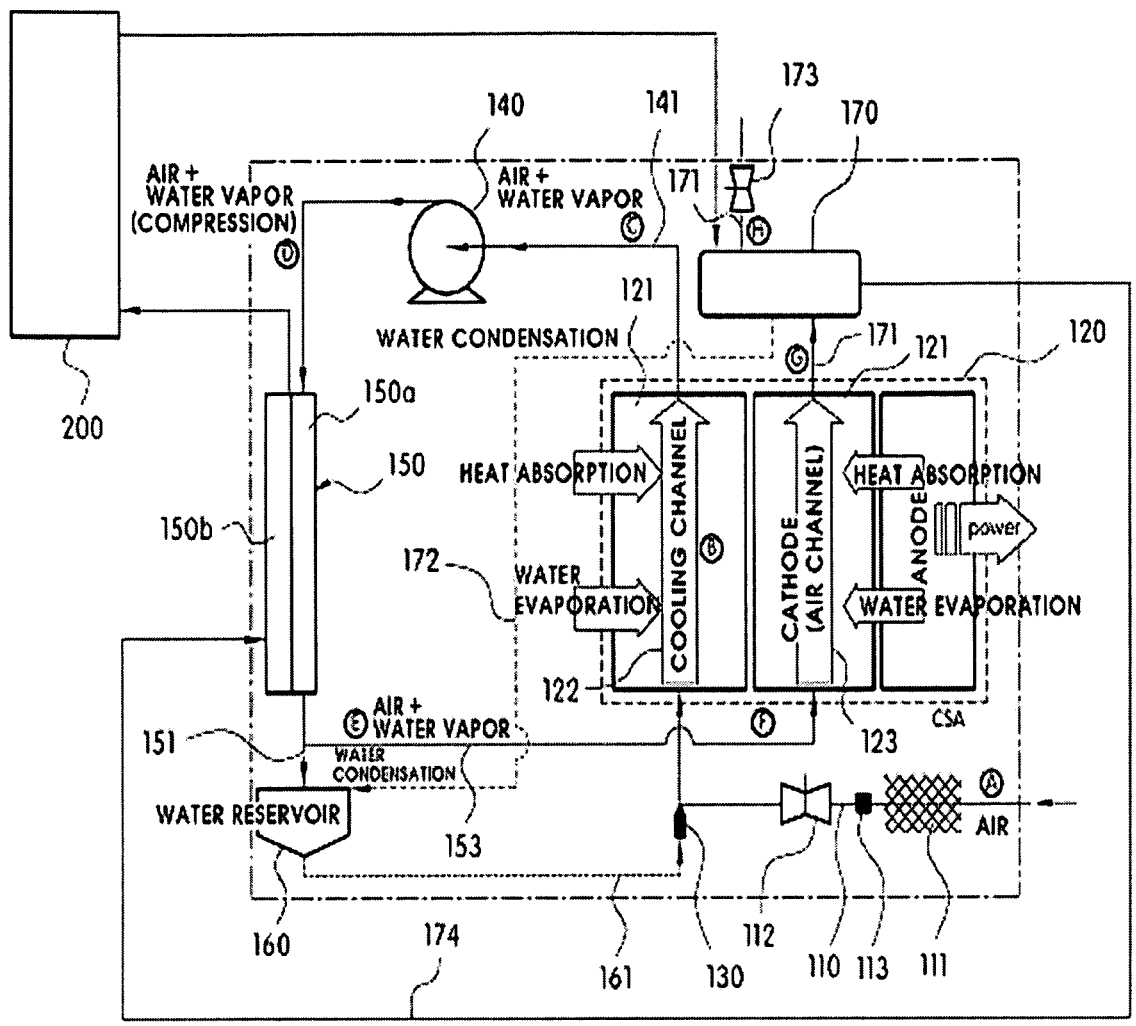
FIG. 13 is a diagram showing the configuration of a fuel cell system in accordance with a preferred embodiment the present invention.

FIG. 13 is a diagram showing the configuration of a fuel cell system in accordance with another embodiment the present invention. The fuel cell system shown in FIG. 13 may, preferably, be applied to a stationary heating system.

As shown in the figure, a heat exchanger 150 is provided instead of the radiator so that a mixture of air and water vapor at a high temperature and a high pressure compressed by an air blower 140 passes through the heat exchanger 150.

The air blower 140 is connected to an inlet side of a high temperature portion 150a of the heat exchanger 150 and an air supply line 153 is coupled to an outlet side of the high temperature portion 150a of the heat exchanger 150 such that the mixture of air and water vapor passing through the high temperature portion 150a of the exchanger 150 to dissipate heat is supplied to an air channel 123 of a fuel cell stack 120 through the air supply line 153.

The mixture of air and water vapor passing through the high temperature portion 150a of the heat exchanger 150 is used as a heat medium for heating fluid passing through a low temperature portion 150b of the heat exchanger 150. While the mixture passes through the high temperature portion 150a of the heat exchanger 150, the mixture dissipates heat to the fluid passing through the low temperature portion 150*b*, that is, a heat exchange process is performed. As a result, it is possible to supply a high temperature fluid for heating from the low temperature portion 150*b* of the heat exchanger 150.

A portion of water vapor from the mixture of air and water vapor discharged from the outlet side of the high temperature portion 150*a* of the heat exchanger 150 is condensed and stored in a water reservoir 160. The humidified air (air+water vapor) containing the remaining water vapor is supplied to the air channel 123 of the fuel cell stack 120 through the air supply line 153 to be used as an oxidant in a fuel cell reaction.

Preferably, a condenser 170 provided at the rear of the air channel 123 of the fuel cell stack 120 is connected to an inlet side of the low temperature portion 150*b* of the heat exchanger 150 through a separate water supply line 174 such that water used as a refrigerant of the condenser 170 is supplied to the low temperature portion 150*b* of the heat exchanger 150 through the water supply line 174.

Moreover, a heating pipe, a hot water pipe, and a pipe 200 connected to an external radiator may be connected to an outlet side of the low temperature portion 150*b* of the heat exchanger 150.

Accordingly, while the water supplied from the condenser 170 passes through the low temperature portion 150*b* of the heat exchanger 150, it is heat-exchanged with the mixture of air and water vapor of the high temperature portion 150*a* and, as a result, it receives heat from the high temperature portion 150*a* and, at the same time, cools the mixture of the high temperature portion 150*a*.

The water heated while passing through the low temperature portion 150*b* is then supplied to the heating pipe, the hot water pipe, and the pipe 200 of the external radiator to be used as hot water for heating, and the water used as hot water is then returned to the condenser 170 through a separate collection line 175.

The water returned to the condenser 170 may be used as a refrigerant for condensing the water vapor of exhaust gas. Subsequently, the water in the condenser 170 is returned to the low temperature portion 150*b* of the heat exchanger 150 to be heated. That is, the water is circulated through the condenser 170, the heat exchanger 150, and the pipes.

As above, the fuel cell system in this embodiment may be used as a home heating system, in which the fuel cell system is used for electric power generation and, at the same time, the heat generated from the fuel cell system is used for heating, thus maximizing energy utilization.

In case of a conventional PEMFC, since the operation temperature is about 70° C., it is difficult to supply hot water by heat-exchanging the same; however, in the fuel cell system of the present invention, the mixture of air and water vapor at a temperature of about 70° C. discharged from the fuel cell stack 120 can be compressed to a higher temperature by the air blower 140 to be directly used as a heat source for heating.

Since the air compressed to a high temperature and high pressure state at an outlet position (D) of the air blower 140 has a high temperature of about 190° C., when the air is heat-exchanged in the heat exchanger 150, it is possible to supply hot water.

The fuel cell system having the same configuration can be used as a vehicle heating system. That is, since the coolant temperature is generally low in the fuel cell vehicle, an auxiliary heater such as a PTC heater is used to increase the temperature inside the vehicle; however, the fuel cell system of the present invention can be efficiently used to increase the temperature inside the vehicle instead of the conventional auxiliary heater.

Of course, the fuel cell system of the present invention can be used in various applications as a substitute for various conventional heaters mounted in the vehicles other than the above-described heating purpose. Moreover, the fuel cell system of the present invention can eliminate a fuel cell stack cooling system using coolant, a humidifier, a heater, and the like, and thus the system is simplified and the manufacturing cost is reduced.

As described above, according to the fuel cell system and the method of cooling the same of the present invention, water is injected into air drawn from the atmosphere such that the air mixed with water is passed through the cooling channel of the fuel cell stack under high temperature and low pressure conditions. As a result, the cooling of the fuel cell stack is performed by the latent heat of evaporation of water in the cooling channel, and the air and water discharged from the cooling channel is cooled by the heat dissipation unit and supplied as the oxidant of the fuel cell stack, thus achieving the cooling of the fuel cell stack and the air humidification at the same time.

That is, it is possible to provide the cooling of the fuel cell stack and the air humidification at the same time by a single air line passing through the fuel cell stack without the use of coolant circulating through the inside of the fuel cell stack, and thus the conventional cooling system using coolant and the humidifier for humidifying the air are not required in the present invention.

Accordingly, the present invention provides advantages in that the configuration of the fuel cell system is simplified, lightweight, and downsized, and the manufacturing cost is reduced. Moreover, since the fuel cell system of the present invention does not use coolant, the heat load is reduced during cold start-up.

Furthermore, the output power density is increased and the system control is facilitated due to an increase in the operation pressure of the fuel cell stack and an increase in the relative humidity of the supply air.

In addition, the fuel cell system of the present invention can be applied to a stationary heating system for cogeneration of heat and electricity as well as a house heating system for heating a building and supplying hot water.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell system using evaporative cooling that generates electricity by reacting hydrogen as a fuel and air as an oxidant, the system comprising:
    a fuel cell stack including a cooling channel provided on a bipolar plate separately from an air channel and a hydrogen channel;
    an air inlet line connected to an inlet side of the cooling channel of the fuel cell stack;
    a water injection means provided at the inlet side of the cooling channel to inject water into air introduced to the cooling channel through the air inlet line;
    an air outlet line connected to an outlet side of the cooling channel;
    an air compression means disposed within the air outlet line to receive a mixture of air and water vapor discharged from the cooling channel of the fuel cell stack and to provide a suction force to the cooling channel and to control a negative pressure in the cooling channel to compress the mixture of air and water vapor sucked from the cooling channel;

a heat dissipation unit connected to the air compression means to receive the mixture of air and water vapor compressed by the air compression means to cool and humidify the air and water vapor before reintroducing the air and water vapor to an inlet of an air channel in the fuel cell stack;

an air supply line disposed between and directly connecting an outlet side of the heat dissipation means and the inlet of the air channel of a cathode of the fuel cell stack to supply the compressed and humidified air and water vapor discharged from the heat dissipation means to the inlet of the air channel of the fuel stack to be used as an oxidant for a fuel cell reaction, and wherein water is evaporated while air and water pass through the cooling channel in a state where an internal pressure of the cooling channel is maintained at the negative pressure by the suction force of the air compression means to increase the absolute humidity of the air in the cooling channel and, at the same time, heat generated from the fuel cell stack is absorbed by latent heat of evaporation, thus cooling the fuel cell stack.

2. The system of claim 1, further comprising an inlet valve provided within the cooling air inlet line to adjust the internal pressure of the cooling channel.

3. The system of claim 1, further comprising a water reservoir provided at the outlet side of the heat dissipation unit and storing condensed water discharged from the heat dissipation unit, wherein water stored in the water reservoir is supplied to the water injection means through a water supply line to be reused as water to be injected into air in the cooling air inlet line.

4. The system of claim 1, further comprising:

a condenser provided at the rear of the fuel cell stack and connected to a discharge line coupled to an outlet side of the air channel to condense and separate water vapor from exhaust gas; and an outlet valve provided on the discharge line to adjust the amount of water collected by the condenser and the internal pressure of the air channel.

5. The system of claim 4, wherein the condenser is connected to the water reservoir through a water collection line such that the condensed water is collected into the water reservoir.

6. The system of claim 1, further comprising:

a bypass line, branched off from the discharge line in front of the heat dissipation unit and connected to the air supply line, for bypassing air and water vapor discharged from the air compression means; and a valve provided at a position where the bypass line is branched off from the discharge line for adjusting the amount of bypassed air and water vapor.

7. The system of claim 1, wherein the heat dissipation unit is a radiator in a fuel cell vehicle.

8. The system of claim 1, wherein the heat dissipation unit is a heat exchanger that uses air and water vapor discharged from the air compression means as a heat medium of a high temperature portion thereof and supplies hot water, passing through a low temperature portion thereof and heat-exchanged with the heat medium of the high temperature portion, through a pipe as hot water for heating.

9. The system of claim 1, wherein the inner surface of the cooling channel is subjected to a hydrophilic coating process.

10. A method of cooling a fuel cell system that generates electricity by reacting hydrogen as a fuel and air as an oxidant and includes a fuel cell stack including a cooling channel provided on a bipolar plate separately from an air channel and a hydrogen channel, the method comprising:

driving an air compression means disposed within the cooling air outlet line to directly receive a mixture of air and water vapor discharged from the cooling line of the fuel cell stack and to suck air through an air inlet line connected to an inlet side of the cooling channel and to control a negative pressure in the cooling channel; and injecting, by a water injection means provided at the inlet side of the cooling channel, water into air sucked into the cooling channel through the air inlet line, so that water is evaporated while air and water pass through the cooling channel when an internal pressure of the cooling channel is maintained at the negative pressure by the suction force of the air compression means to increase the absolute humidity of the air in the cooling channel and, at the same time, heat generated from the fuel cell stack is absorbed by latent heat of evaporation, thus cooling the fuel cell stack;

receiving, by a heat dissipation unit, a compressed mixture of air and water vapor directly from the air compression means and cooling and humidifying the compressed air and water vapor before reintroducing the air and water vapor to an inlet of an air channel in the fuel cell stack, wherein an air supply line is disposed at an outlet side of the heat dissipation unit and connected to an air channel of the fuel cell stack; and supplying compressed and humidified air containing water vapor discharged from the heat dissipation unit directly to the air channel of a cathode of the fuel stack through an outlet of an air supply line, the supplied compressed and humidified air and water vapor used as an oxidant for a fuel cell reaction.

11. The method of claim 10, wherein the fuel cell system further comprises a water reservoir, provided at the outlet side of the heat dissipation unit, for storing condensed water discharged from the heat dissipation unit and supplying the stored water to the water injection means, and wherein the method further comprises supplying the water of the water reservoir to the water injection means to be reused as water to be injected into air.

12. The method of claim 10, wherein the fuel cell system further comprises a condenser, provided at the rear of the fuel cell stack and connected to a discharge line coupled to an outlet side of the air channel, for condensing and separating water vapor from exhaust gas, and an outlet valve provided on the discharge line, and wherein the method further comprises controlling an opening degree of the outlet valve to adjust the amount of water collected by the condenser and the internal pressure of the air channel.

13. The method of claim 12, wherein the condenser is connected to the water reservoir through a water collection line such that the condensed water is collected into the water reservoir.

14. The method of claim 10, wherein the fuel cell system further comprises an inlet valve provided on the air inlet line, and wherein the method further comprises controlling an opening degree of the inlet valve to adjust the internal pressure of the cooling channel.

15. A fuel cell system using evaporative cooling that generates electricity by reacting hydrogen as a fuel and air as an oxidant, the system comprising:

a fuel cell stack including a cooling channel provided on a bipolar plate separately from an air channel and a hydrogen channel;

an air inlet line connected to an inlet side of the cooling channel of the fuel cell stack;

a water injection means provided at the inlet side of the cooling channel to inject water into air introduced to the cooling channel through the air inlet line;

an air outlet line connected to an outlet side of the cooling channel;

an air compression means disposed within the air outlet line to receive a mixture of air and water vapor discharged from the cooling channel of the fuel cell stack and to provide a suction force to the cooling channel and to control a negative pressure in the cooling channel to compress the mixture of air and water vapor sucked from the cooling channel;

a heat dissipation unit connected to the air compression means and receiving the mixture of air and water vapor compressed by the air compression means and cooling and humidifying the same;

an air supply line disposed between and directly connecting an outlet side of the heat dissipation means and the inlet of the air channel of the fuel cell stack to supply the compressed and humidified air and water vapor discharged from the heat dissipation means to the inlet of the air channel of a cathode of the fuel stack to be used as an oxidant for a fuel cell reaction;

a water reservoir provided at the outlet side of the heat dissipation unit and storing condensed water discharged from the heat dissipation unit, wherein water stored in the water reservoir is supplied to the water injection means through a water supply line to be reused as water to be injected into air, a condenser provided at the rear of the fuel cell stack and connected to a discharge line coupled to an outlet side of the air channel to condense and separate water vapor from exhaust gas, wherein the condenser is connected to the water reservoir through a water collection line such that the condensed water is collected into the water reservoir;

an outlet valve provided on the discharge line to adjust the amount of water collected by the condenser and the internal pressure of the air channel;

a bypass line, branched off from the discharge line in front of the heat dissipation unit and connected to the air supply line, for bypassing air and water vapor discharged from the air compression means; and a valve provided at a position where the bypass line is branched off from the discharge line for adjusting the amount of bypassed air and water vapor, wherein humidified air containing water vapor discharged from the heat dissipation unit is supplied to the air channel of the fuel stack through the air supply line to be used as an oxidant for a fuel cell reaction, and wherein water is evaporated while air and water pass through the cooling channel in a state where an internal pressure of the cooling channel is maintained at the negative pressure by the suction force of the air compression means to increase the absolute humidity of the air in the cooling channel and, at the same time, heat generated from the fuel cell stack is absorbed by latent heat of evaporation, thus cooling the fuel cell stack.

16. The system of claim 15, wherein the heat dissipation unit is a radiator in a fuel cell vehicle.

* * * * *